Jan. 4, 1966 W. J. POWERS, JR 3,226,964
METHOD AND APPARATUS FOR CUTTING A PLURALITY OF OBJECTS
Filed Aug. 1, 1962 5 Sheets-Sheet 1
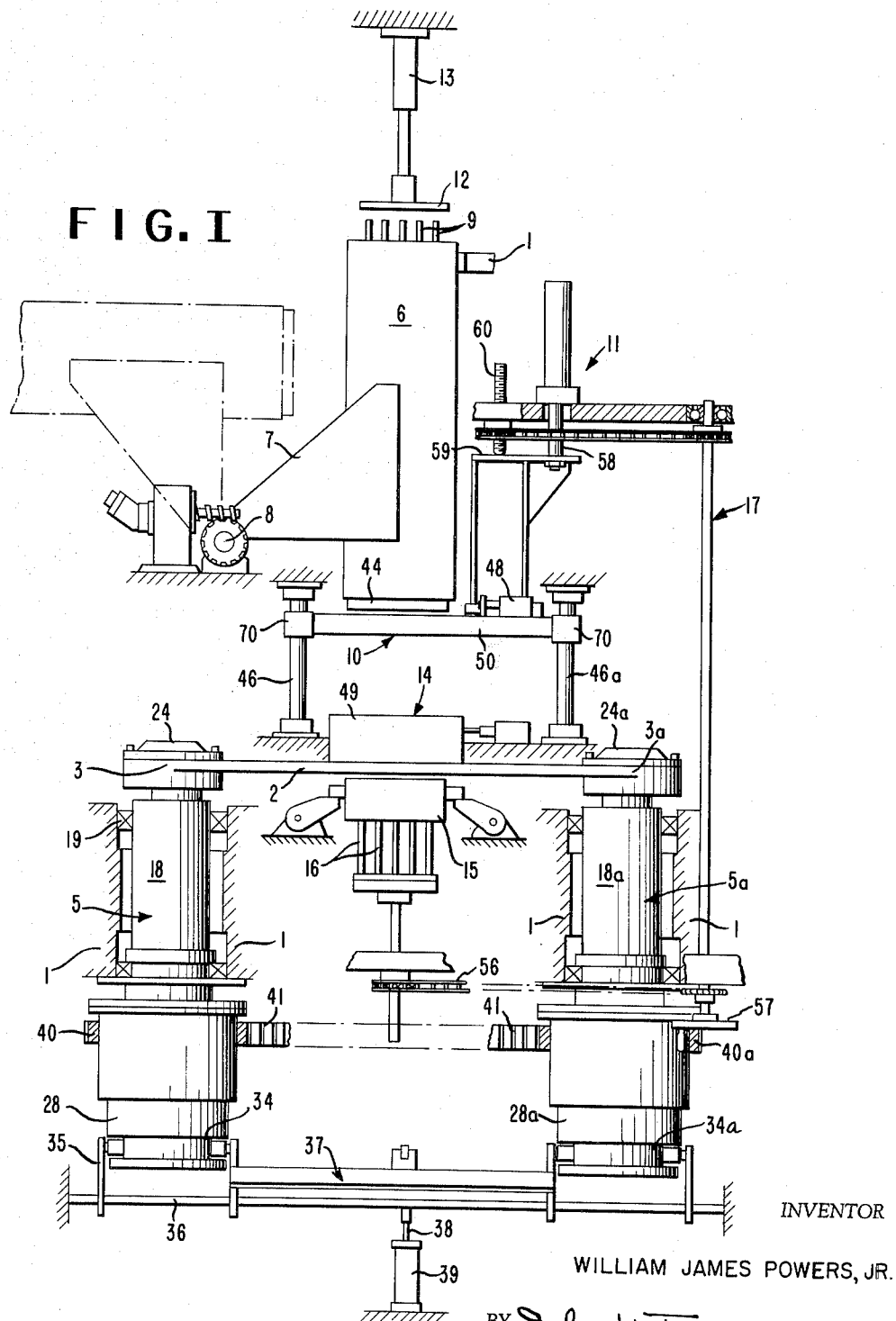
FIG. I
INVENTOR
WILLIAM JAMES POWERS, JR.
BY
ATTORNEY

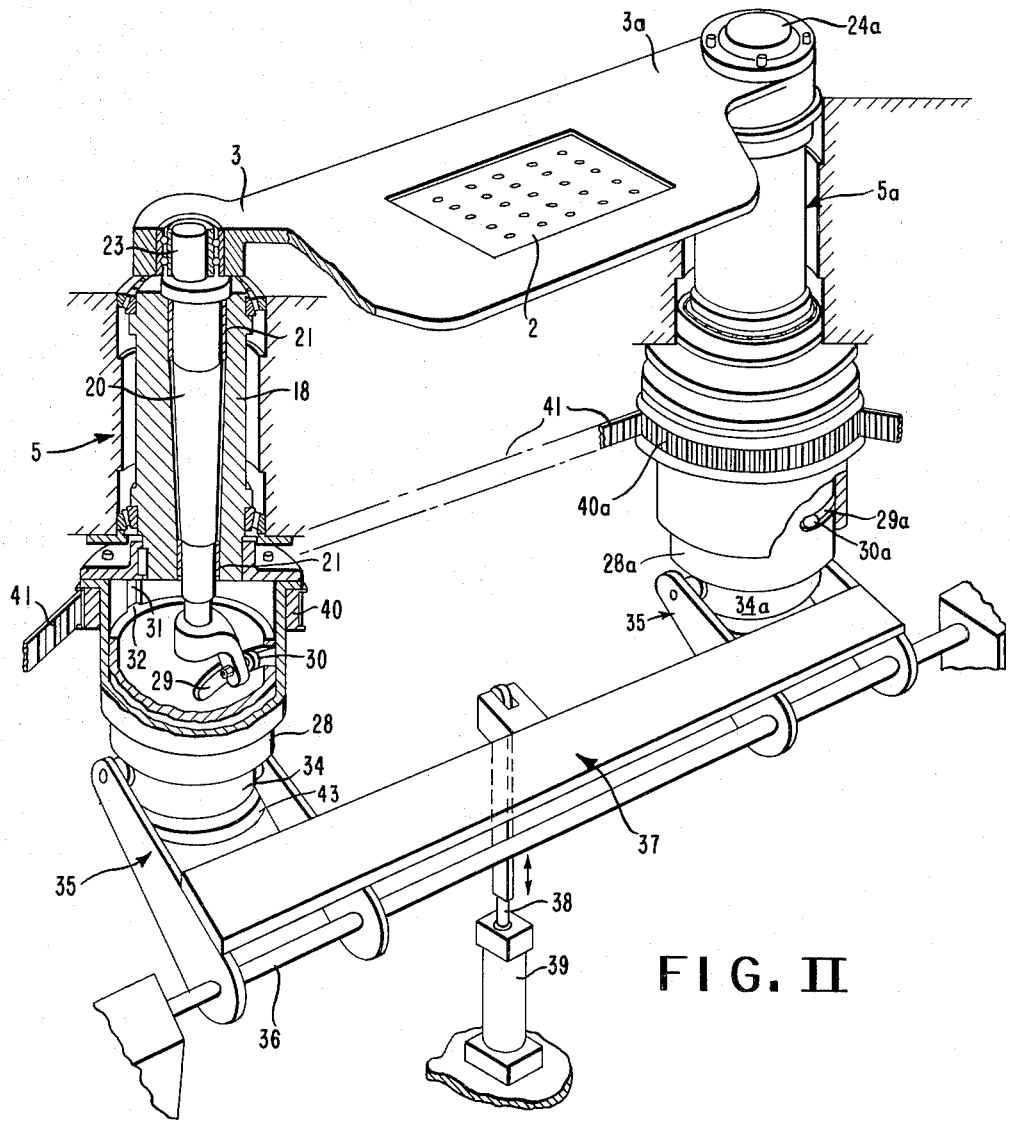
FIG. II

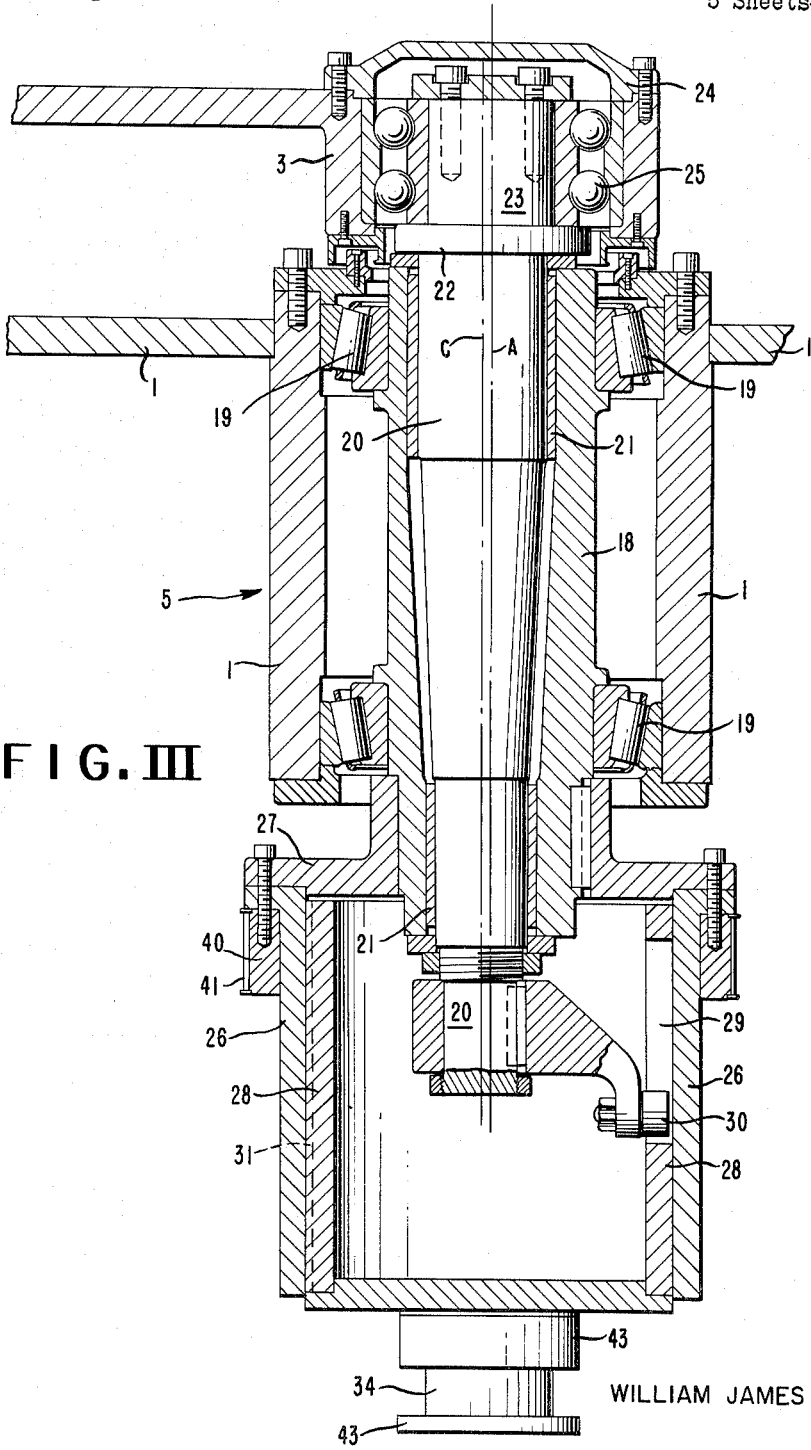
FIG. III
INVENTOR
WILLIAM JAMES POWERS, JR.

Jan. 4, 1966 W. J. POWERS, JR 3,226,964
METHOD AND APPARATUS FOR CUTTING A PLURALITY OF OBJECTS
Filed Aug. 1, 1962 5 Sheets-Sheet 4
FIG. IV
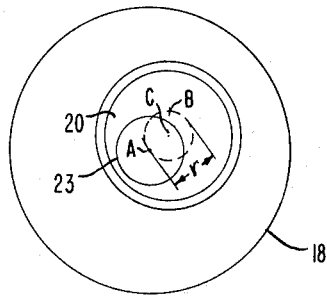
FIG. VII
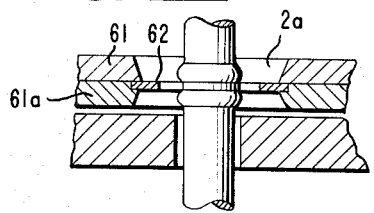
FIG. VIII
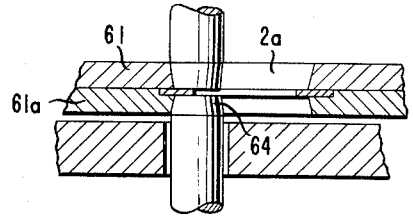
FIG. VI
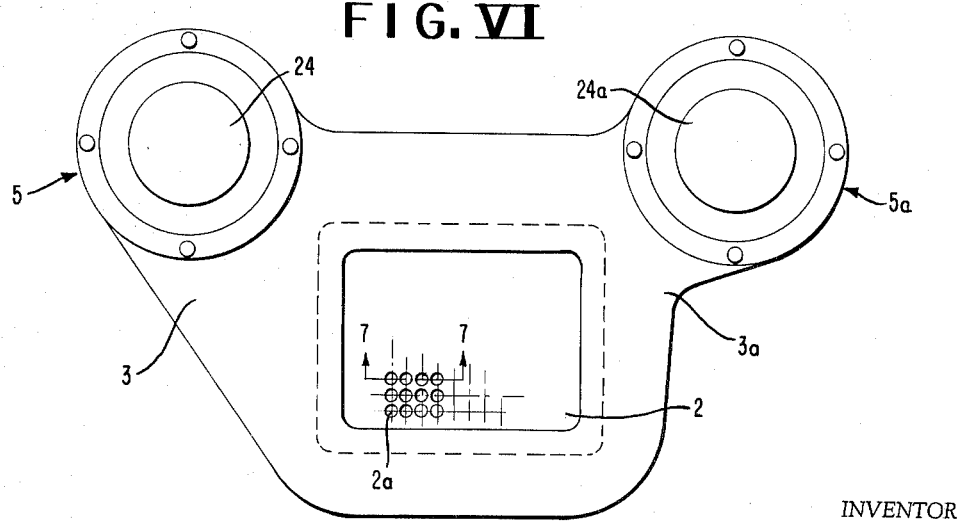
INVENTOR
WILLIAM JAMES POWERS, JR.
BY
ATTORNEY

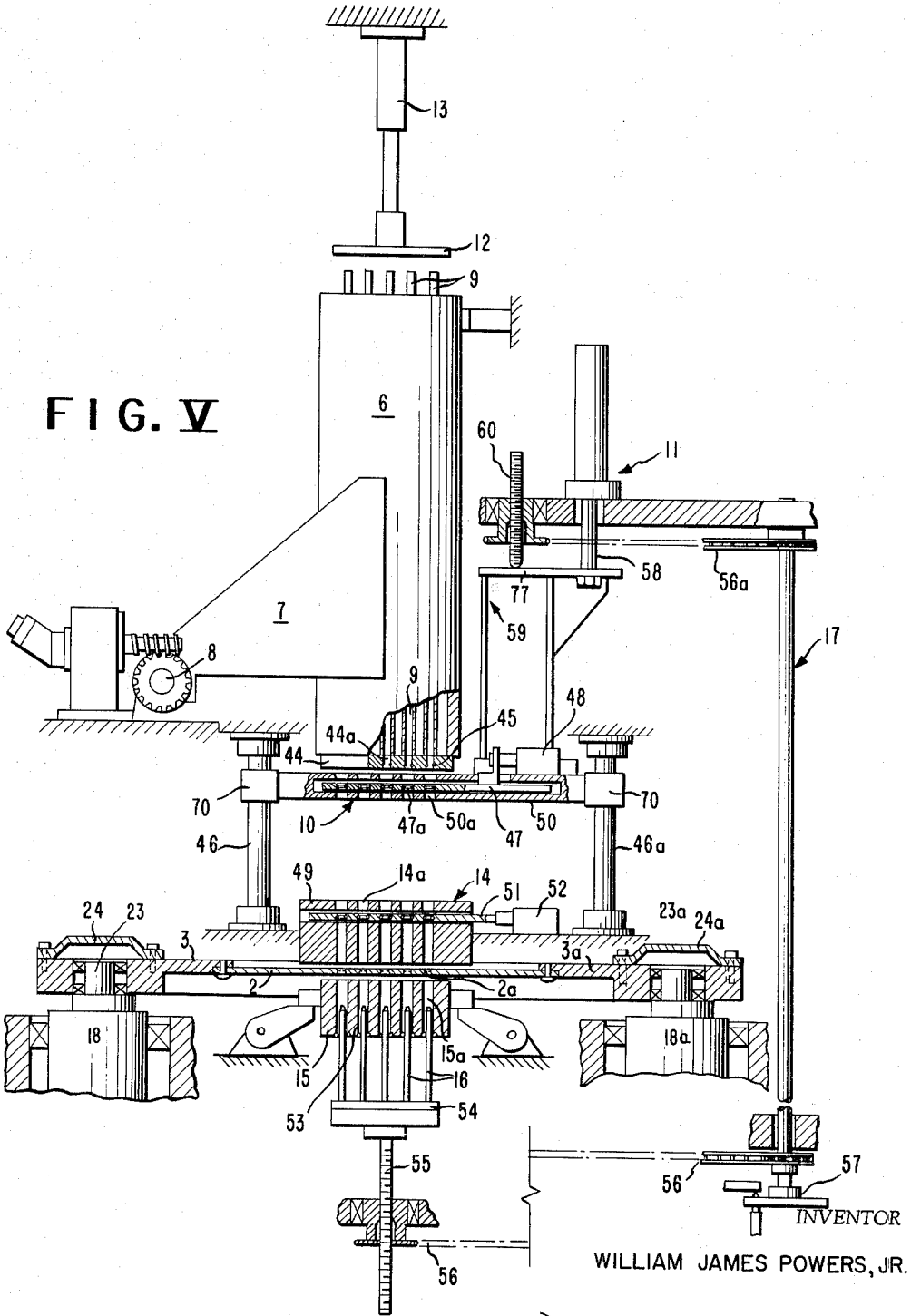

United States Patent Office 3,226,964
Patented Jan. 4, 1966

3,226,964
METHOD AND APPARATUS FOR CUTTING A PLURALITY OF OBJECTS
William James Powers, Jr., Wilmington, Del., assignor to E. I. du Pont de Nemours and Company, Wilmington, Del., a corporation of Delaware
Filed Aug. 1, 1962, Ser. No. 213,918
14 Claims. (Cl. 72—71)

This invention relates to an assembly designed to sever cylindrical objects. More particularly, this invention is directed to a cutter plate and to an apparatus designed to sever a plurality of metal tubes.

In a commercial media where cylinders and metal tubes must be severed, a need exists for an apparatus which can simultaneously sever such metal tubing with the avoidance of chips and turnings. Additionally, the present technique of using a blade to remove a wedge or depth of metal where separation is effected results in the production of gaps in tube length which is evidenced in varied lengths of tubing where precision is required.

It is therefore an object of this invention to provide a cutter plate designed to simultaneously sever a plurality of objects.

It is a further object of this invention to provide a cutter plate designed to sever objects by displacement as opposed to the removal of material.

A further object of this invention is to produce an assembly for simultaneously severing a plurality of objects.

Yet another object of this invention is to provide an assembly to simultaneously effect the severance of a plurality of metal tubes without producing burrs and chips.

Another object is to provide an assembly to simultaneously effect the severance of metal objects resulting in the production of tubes of recurring uniform length.

Still a further object is to provide an assembly to effect the severance of a plurality of metal tubes by displacement of the metal around the circumference of the tube.

These and other objects are accomplished by the instant invention which is quite generally defined as a tube severance assembly which comprises a frame, means for providing oscillating motion of varying amplitude mounted on said frame, and a cutter plate held by said oscillating means.

The term "oscillating motion" as used herein is restricted to that motion which would cause a rectangular plate to rotate in a circular fashion in one plane without disturbing the angle formed by the sides of the rectangle with respect to the plane, when it is at rest. In short, the rectangle must rotate without its sides accomplishing an angular deviation from the position they occupied while the rectangular plate was at rest, e.g., if at rest the two long sides were horizontal with respect to its environment, they must remain horizontal during the full course of the oscillation and one corner of the rectangle must not rise above, or fall below, the corner adjacent to it.

It is also required that the oscillation be attended by varying amplitude. This can be defined quite simply in terms of the oscillating motion of the above-given rectangle. With the varying amplitude requirement in effect, the oscillation accomplished by the rectangle would no longer describe a simple circle, but rather, a circle of increasing radius, or a spiral. To paint a word picture, one would first rotate the given rectangle in a circular fashion without allowing either of the two corners on one side to rise above or fall below the other, and then simply and slowly, continuously move the rectangle in a radial direction throughout each revolution. A spiral is thus traced by any point on the rectangle in any one complete rotation.

It is important that the engagement of the cutter plate with the oscillating means used be such as to permit only the oscillation motion described above. This is obtained ideally with two oscillating means, each gripping the cutter plate at a position on the plate identical to and exactly opposite the other.

The preferred assembly of the instant invention provides a tube-severing apparatus comprising a frame, a first and second means for providing oscillating motion mounted on such frame, said oscillating motion means comprising a cylinder rotatably held by said frame, said cylinder having an eccentric longitudinal bore therethrough, a shaft rotatably contained by the bore of said cylinder, said shaft being provided with an offset extremity free of contact with said cylinder and said shaft being positioned to insure that the centers of said cylinder and said offset extremity coincide, means for rotating said cylinder, means for rotating said shaft, a member adapted to relay eccentric movement from said offset extremity to said cutter plate, and a cutter plate held by each of said oscillating motion means, said cutter plate comprising at least one substantially flat plate having a plurality of apertures therethrough, each of said apertures being provided with a cuttter surface and each of said apertures being tapered away from said cutting surface.

In any event, the instant invention provides a method for simultaneously severing a plurality of tubes which comprises securing said tubes in a fixed position, simultaneously and continuously inducing complete circumferential displacement about a point on each of said tubes, and collecting said severed tubes.

The phrase "inducing complete circumferential displacement about a point on said tube" is defined as simply displacing the material of the tube or cylinder along a given circumferential line on a cylinder or tube as opposed to removing a wedge, or thin width, of material from the cylinder or tube along the circumferential line as is accomplished in a normal cutting operation. The invention could thus be described as defining a method of severing by displacement rather than by severing by complete removal of material along the line of severance.

The instant invention will be more readily understood by reference to the following drawings which describe, in detail, a preferred embodiment. The embodiment depicted is not to be construed as limiting, but rather as being illustrative of, the instant invention.

FIGURE I depicts one schematic view of the instant invention.

FIGURE II is a view of the eccentric drive arrangement with parts removed.

FIGURE III is an enlarged cross-sectional detailed view of the dual shaft eccentric mechanism.

FIGURE IV is a schematic view showing the operative relationship of the axes of the components of eccentric drive mechanism 5 shown in FIGURES II and III.

FIGURE V is an enlarged schematic representation of the magazine, loading and receiving assemblies with parts in section.

FIGURE VI depicts the cutter plate of the embodiment described.

FIGURE VII is a cross-sectional view taken along line 7—7 of FIGURE VI and depicts a tube just after undergoing severance by displacement.

FIGURE VIII depicts a metal tube chamfered by the instant assembly.

In FIGURE I, two eccentric drive mechanisms 5 and 5a rotatably held by frame 1 provide eccentric motion of varying amplitude that is communicated to cutter plate 2 through extension arms 3 and 3a. The eccentric drive mechanisms 5 and 5a are driven by belt 41, driven by a motor (not shown). A tube or cylinder supply magazine 6 which is secured to arm 7 is, in turn, pivotly mounted on frame 1 by shaft 8 and can be driven by a motor (not shown) or operated manually to the position shown which is designed to rotate from a position continuously supplying the cutter plate 2, to a position of rest, which is indicated by the broken lines, where a new supply of tubes 9 can be inserted. Two assemblies appear between the supply magazine 6 and the cutter plate 2. The feed plate assembly 10 is slidably mounted on frame 1 and is hydraulically operated by hydraulic assembly 11.

The feed plate assembly 10 is designed to engage the tubes 9 as they are forced through the magazine 6 by tamp 12 of the piston-like assembly 13, and to lead these tubes 9 into the guide assembly 14, into the apertures of the cutter plate 2 and on into the supply block 15 where the extremities of the tubes meet stop pins 16. The feed plate assembly 10 then releases its hold on the tubes 9, whereupon the guide assembly 14 grips the tubes 9 in a fixed position. The supply block 15 below the cutter plate 2 is movably mounted on the frame 1. A control assembly 17 is designed to simultaneously adjust the position of the feed plate 10 and the position of the stop pins 16, thus controlling the length of the severed tubes.

FIGURE II depicts the cutter plate 2, the eccentric drive mechanisms 5 and 5a and the yoke lever assembly 37 with one of the eccentric drive mechanisms shown in section. FIGURE III presents a more detailed cross-sectional view of one of the eccentric drive or dual shaft eccentric drive mechanisms.

In FIGURE III, the cylinder 18 is rotatably housed by the frame 1 through frictionless bearings 19. The bore of cylinder 18 is eccentric, as can readily be seen, and shaft 20 is rotatably mounted therein. Bushings 21 are inserted between the wall of the cylinder 18 and the shaft 20 and a collar 22 insures the position of the shaft 20 within the cylinder 18. Shaft 20 is provided with an offset extremity 23 which abuts frictionless bearings 25 contained by cover 24. The offset extremity 23 does not otherwise come in contact with the cover 24, nor is the cover 24 secured to anything but arm 3. A cylindrical support 26 affixed to the flanged collar 27, which is itself rigidly fastened to cylinder 18, extends to contain shaft 20 and slideably contains hollow barrel cam 28 whose inside surface is modified (see FIGURE II) by a cam groove 29 which restrains the cam follower 30 securely attached in a fixed position to shaft 20. The inner periphery of the cylindrical support 26 and the outer periphery of the hollow barrel cam 28 are provided with complementary key grooves 31 and keys 32 to insure the rotational position of the hollow barreled cam 28.

FIGURE II shows that the circumferential extension 43 extends from cam 28 and is provided with a circumferential groove 34. Yoke lever 35 is rotatably mounted on bar 36, which is held by frame 1, and fastened to a single integral link 37 that is pivotally mounted on shaft 38 housed in hydraulic assembly 39. The shaft 38 is controlled by hydraulic means (not shown) and controls the vertical movement of shaft 38 as shown by the arrows. It actuates linkage 37 and yoke 35 which, in turn, engages groove 34 thereby moving the hollow barrel cam 28 in a direction toward, or away from, the offset extremity 23. Thus, cam follower 30 is forced to follow the cam groove 29 with the result that independent rotation is provided for shaft 20 having offset extremity 23. Also, engaging the cylindrical support 26 is a power grip pulley 40 which is operatively engaged by means of timing belt 41 to a commercial electric motor drive (not shown) which simultaneously rotates, or drives, the cylinder 18 and the shaft 20 and oscillates cutter plate 2. Eccentric drive mechanism 5a of FIGURE II operates simultaneously with and in an identical manner to unit 5. Thus, pulleys 40 and 40a are both driven by belt 41, and parts 37–39 and 35 actuate 34a, 28a, 29a and 30a in the manner just described for the correspondingly numbered but unlettered parts (i.e., parts with the suffix a) of drive mechanism 5.

Note that on FIGURE II, follower 30a is shown in the depicted position to illustrate the manner in which the drive mechanism work and that followers 30 and 30a normally occupy the same position relative to the length of their respective cam grooves 29 and 29a.

FIGURE III also relates the positioning of the shaft 20 with its offset 23 in the eccentric bore of cylinder 18. When the eccentric drive mechanism 5 is actuated, i.e., caused to rotate as a unit by belt 41, cylinder 18 and shaft 20 are caused to rotate about the cylinder's axis A which, by design, initially coincides with the axial center of offset 23 as shown on FIGURE III. Under these conditions, no eccentric motion is provided and the rotational axis of the eccentric drive mechanism 5 is that axis designated A. The unit contained by cylinder 18 is then rotated about axis C of shaft 20 in the following manner. For the sake of simplicity, let the axial center of offset 23 be designated as axis B (see FIGURE IV). When the plural axis A and B coincide the axis A shall represent both. The cam follower 30 and the cam groove 29 in hollow barrel cam 28 are so machined that when the cam follower 30 is located (as shown in FIGURE II) at the uppermost end of the groove 29, i.e., the cam 28 is partially extended from the cylindrical support 26, the rotational center of the offset 23 and the center of rotation of cylinder 18 coincide. Retracting the cam 28 slidably into the cylindrical support 26 forces the cam follower 30 along the length of groove 29 to the position shown for follower 30a (in eccentric drive mechanism 5a in FIGURE II) and for follower 30 on FIGURE III, thereby causing shaft 20 to rotate about its axis C independently of the cylinder 18; thus, the axis B of offset 23 which had coincided with the axis A is forced to follow a path shown by the broken lines in FIGURE IV. The distance $r$ defines the maximum distance that the axis B of offset 23 is displaced as it travels, by reason of 180° rotation of shaft 20, along the path given by dotted lines. The value $r$ then defines maximum displacement of the axis B of offset 23. The distance $r$ is measured from the center of rotation A of the cylinder 18, and represents 180 degrees of rotation of the shaft 20 about its axis. It is readily understood then, that the amount of independent rotation given to shaft 20 is dependent upon the length and angle of inclination of cam groove 29, as well as the position of cam follower 30 within cam groove 29. It is also apparent that with the offset 23 at its original position, i.e., its center B corresponding to the center rotation of the cylinder 18, i.e., A, and with the cylinder 18 (and thus the whole device) experiencing rotation provided by pulley 40, the offset 23 will rotate, as does the cylinder, with no eccentricity or wobble. However, as the center B of the offset 23 and the center of rotation A of the cylinder 18 part, one from the other, an eccentricity or wobble is produced (the rotation of the device continuing) and the degree of eccentricity or wobble continues to increase as the distance between the respective axial centers B and A of the offset 23 and the cylinder 18 increases until its maximum is reached at a distance $r$. The value $r$ is then the measure of the amplitude of eccentricity of the mechanism 5 or 5a, or when both are secured to the cutter blade 2, of the eccentricity provided, since both 5 and 5a are synchronized.

FIGURE V depicts schematically the magazine, loading and receiving assemblies of the embodiment shown in FIGURE I. The magazine 6 may have individual tube receivers running its length and is shown as containing metal tubes 9. It is secured to arm 7 which is pivotally mounted to frame 1 at point 8. The magazine may then be pivoted about point 8 by motor means or by mechanical means from a position of rest or a loading position as is shown by the dotted lines in FIGURE I to a position as depicted where it feeds the cutter plate 2. The end plate 44, having a plurality of apertures 44a therein, is located at the extremity of the magazine 6. Each aperture 44a is provided with an O-ring 45 which functions to restrict the movement of the tubes 9 which would otherwise drop from the magazine 6 of their own accord when the magazine 6 was addressing the feed plate assembly 10. The piston-like tamp 12 is a part of piston-like assembly 13 which is mounted on frame 1. The tamp 12 is designed to be depressed, engaging the extremities of tubes 9 when they are in a position for initial feeding (as shown) to force them past the O-rings 45 into the feed plate assembly 10.

The feed plate assembly 10 is hydraulically operated and slidably mounted by sleeve bearings 70 on rods 46 and 46a. This assembly is defined by plate 50 having a plurality of apertures 50a therein which complement those (2a) of the cutter plate 2 and those (44a) of the magazine 6. It is provided with an internal cavity having a reciprocating clamping plate 47 slidably held therein. The clamping plate 47 has a plurality of corresponding apertures 47a therein and its reciprocal motion is controlled by short stroke actuator 48.

Below the feed plate assembly 10, the guide assembly 14 is located. It is defined by a block 49 having clamping plate 51 slidably mounted therein, the short stroke actuator 52 being adapted to provide reciprocating movement to clamping plate 51. All of the components given have a plurality of apertures therein complementing the apertures of the cutter plate 2 and the others in the assemblies mentioned. The clamp plate 51 operates as did plate 47. The cutter plate 2 is next in sequence and is shown as being securely affixed to the two arm extensions 3 and 3a, which are carried by offsets 23 and 23a and attached to covers 24 and 24a, respectively. This particular is shown in greater detail in FIGURE VI.

Below the cutter plate 2, the supply block 15, movably mounted on the frame 1 and having receptacles 53 therein, complements all of the previously discussed apertures. Individual stop pins 16 supported by plate 54 extend into the receptacles 53 and act as stops for the extremities of tubes 9. Plate 54 is affixed to, and supported by, an adjustable elevating screw 55 which is engaged via a chain and sprocket arrangement 56 to a calibrated control mechanism 57. The control mechanism 57 is operatively attached to feed assembly 10 by means of shaft assembly 17. The position of the feed assembly 10 is controlled by hydraulic assembly 11 by means of piston 58 and linkage 59. A stop in the form of an adjustable screw 60 connected to the chain and sprocket assembly 56a and operated by control 57 (which simultaneously adjusts both adjusting screws 55 and 60) acts to arrest the upward movement of the feed assembly 10 toward the magazine by contacting linkage 59 on surface 77. By this combination of controls, the severed lengths of tubes 9 can be accurately determined.

The cutter plate 2 is shown in FIGURE VI as a rectangular plate; however, it may be of varied shapes. This particular embodiment is defined by two metal plates 61 and 61a (see FIGURES VII and VIII) having a circular tool steel cutter blade 62 sandwiched therebetween. A plurality of complementary tapered apertures 2a are provided in each of the outer plates. In each case the aperture is tapered inwardly toward the tool steel cutting blade 62 which has an annular, square edged cutting surface projecting into the tapered aperture 2a. The oscillating motion at the cutter plate is generally circular and is characterized by increasing amplitude when in motion such that any point on the plates defines a spiral. Because of the kind of oscillating motion required, no point on any one side of the rectangular plate ever rises above or falls below any other point on the same side of the rectangle. That is, the cutter plate itself does not rotate about its own axis. This is a critical feature since if the cutter plate were rotated about its own center it would be impossible to sever a plurality of tubes simultaneously.

In FIGURE VII an enlarged cross sectional view of an aperture 2a of the cutter plate is given. As is shown in this embodiment, the apertures in both plates 61 and 61a are beveled inwardly toward the cutter blade 62. The cutter blade 62 is shown as possessing a square projecting extremity as opposed to the normal knife-like or tapered projection of a cutting blade. A knife-like or tapered projection would function in the instant invention. However, as a practical matter, it has been determined that a square-edged projecting extremity about .002 to .006 inch thick provides the longest operating life with a minimum of material displacement; thus, the square edge is merely a preferred embodiment and should not be construed as a limitation on the invention. While the depicted cutting plate 2 has two plates 61 and 61a which sandwich the cutter blade 62, the presence of one would be sufficient.

FIGURES VII and VIII depict a hollow tube severed by the instant invention. FIGURE VII shows the tube 9 just after severance. It should be noted that around the circumferential point of severance a shoulder has been built up. This is due to the fact that severance has been accomplished by displacement of the metal rather than by removal of it. FIGURE VIII shows the same tube after it has been subjected to further oscillation after severance. The action of the beveled apertures 2a has produced a chamfered effect on the tube 9. This, of course, is accomplished through the continued oscillating of increasing amplitude. The action of the beveled apertures has further displaced the metal of the tube to provide the circumferentially beveled surface 64.

In actual operation the supply mechanism held by arm 7 is rotated counterclockwise to position shown by dotted lines in FIGURE I and is loaded with a supply of hollow tubes 9. The magazine 6 is then rotated clockwise around point 8 to a position addressing feed plate assembly 10. As shown in FIGURE V, movement of the tubes within the magazine is arrested by O-rings 45 to prevent the tubes from falling onto the feed plate assembly 10. Tamp 12 of piston-like tamp assembly 13 is then depressed to force the tubes past the O-rings 45 and apertures 47a a perceptible distance. The clamping plate 47, slideably mounted in feed assembly 10, is then actuated, i.e., forced in a horizontal direction where each of the apertures in the plate 47 impinge upon and hold the tubes 9 in a fixed position, by short stroke actuator 48 to secure the tubes 9 in a fixed position within feed plate assembly 10. The feed plate assembly 10 is then lowered on rods 46 and 46a by piston 58 of hydraulic assembly 11 to a position contiguous to the guide assembly 14. The tubes having entered and passed through the apertures 14a in this guide assembly 14 are then gripped in a fixed position by clamp plate 51 actuated, in the same manner as was clamp 47 in feed plate assembly 10, by short stroke actuator 52 while the short stroke actuator 48 is deactivated and releases the clamping action of clamp plate 47. Now that the tubes are so positioned in by guide assembly 14, the tubes 9 extend through the apertures 2a in cutter plate 2 through and into the supply block 15 where their extremities contact stop pins 16. Upon deactivation of short stroke activator 48 and the release of the clamping plate 47, the feed assembly 10 returns to its starting position and awaits the proper signal to transmit additional lengths of tubing 9 following the pattern just described. The tubes are now held by guide assembly 14 in the cutter plate 2 such as to conform to a preset determination with regards to the length of the severed tubes 9. The point at which severance is to take place on the tubes 9 has been predetermined and preset by reason of the setting of the calibrated control mechanism 57 attached by the chain and sprocket arrangements 56 and 56a to adjustable elevating screws 55 and 60 which simultaneously control the vertical positioning of the stop pins 16 within the supply block 15 and the surface 77 which restricts the upward movement of feed plate assembly 10.

The motor control (not shown) of the eccentric drive mechanisms 5 and 5a has now been actuated and corresponding cylinders 18 and 18a rotate about their respective centers A. Belt 41 simultaneously drives both of the mechanisms 5 and 5a through power grip pulley 40 and 40a. Since eccentric motion or wobble is not desired initially, the center of rotation of cylinders 18 and 18a and the axial center of offsets 23 and 23a respectively (FIGURE V) must coincide exactly as was discussed earlier. This is now the case and cams 28 and 28a occupy the farthest position from their respective offset extremities (as shown in FIGURE II). The cylinder 18, shaft 20 and the offset 23 are all rotating around one center of rotation. Hydraulic assembly 39 by means of shaft 38 now actuates linkage 37 and yokes 35 forcing the hollow barrel cams 28 and 28a vertically and simultaneously upward toward offset extremities 23 and 23a, respectively. Concomitantly, the cam followers 30 and 30a are forced along the cam grooves 29 and 29a an angular distance proportional to the vertical movement of the barrel cams. In any event, neither of the hollow barrel cams 28 or 28a will be moved other than simultaneously; therefore, any discussion of the device 5 will be understood to describe an exactly equal action as regards device 5a in this assembly. This forced movement causes cam follower 30 to rotate shaft 20 a number of degrees, depending upon the distance cam follower 30 is forced to move along the cam groove 29. Any independent rotation of the shaft 20 within cylinder 18 causes the axial center B of the offset 23 to follow the path shown by the broken lines in FIGURE IV. Thus, the center of rotation of the cylinder 18, i.e., A, and the axial center of the offset, i.e., B, no longer coincide and an eccentric motion or a wobble is produced by the rotation of cylinder 18. The degree of wobble is, of course, dependent upon the distance from center A of cylinder 18 and the center B of offset 23. Again it is understood that both offset 23 and 23a are receiving like actions and must then react simultaneously in exactly the same manner. To accomplish tube severance the initial eccentricity must be slight; however, the distance between centers A and B must continue to increase to provide the required eccentricity of increasing amplitude, so that hydraulically actuated linkage 37 will, once actuated, continue to raise hollow barrel cam 28 in a vertical direction toward offset 23, forcing cam follower 30 along cam groove 29. Thus, shaft 20 is forced to rotate independent of cylinder 18 and the greater the degree of rotation (up to 180°) the greater the amplitude since the greater the distance between centers A and B. At 180° rotation of shaft 20 maximum displacement of the centers A and B has occurred and further rotation, i.e., 180° to 360°, would only decrease the distance between the centers A and B to zero at 360°. The eccentricity identically and simultaneously produced by offsets 23 and 23a is transmitted through frictionless bearings 25, to arms 3 and 3a and covers 24 and 24a, which house the bearings 25 and the offset respective offsets. Extension arms 3 and 3a securely engage cutter plate 2 because pivoting engagement is not desired between the cutter plate 2 and the extension arms 3 and 3a. The points of attachment of the arms 3 and 3a with the cutter plate 2 are exactly opposite and uniformly centered with respect to the cutter plate 2 in order to provide the required oscillating motion.

Upon severance of the tubes 9 the oscillation is continued to provide the beveled tube extremities (see FIGURE VIII) or until the maximum degree of oscillation is produced. Return of the hollow barrel cams 28 and 28a to their original positions, i.e., a position farthest from the offset extremities 23 and 23a along the longitudinal axis of the mechanisms 5 and 5a, will cause the oscillation to cease by causing the respective centers A of cylinders 18 and 18a, and the axial center B of the offset extremities 23 and 23a to coincide once again. Thus, although each of the cylinders 18 and 18a and their respective components are still rotating the cutter plate 2 is motionless.

The materials used in fabricating the apparatus of the instant invention will generally be metal with the exception of course of the moving belts and pulleys. It is also possible to use polymeric materials in many instances. This is true of the cutter plate but generally the cutter blade 62 will be produced from tooled steel or some similar material.

A critical factor is, as has been mentioned, the particular kind of oscillating motion provided; however, just as critical is the way in which the cutter plate 2 is held by extension arms 3 and 3a. The points of attachment of the arms on the cutter plate 2 must be symmetrical and, of course, complementary, in order to insure that the cutter plate does not receive rotation independent of that provided by the eccentric drive mechanism which would result in non-uniform displacement of material about the object to be severed.

The cutting surface provided for each aperture in the cutting plate has a square-cornered flat surface which engages the surface of the object to be severed. The instant invention provides severance by displacement of material about a circumferential line on the object as opposed to the removal of material from the object. The result of this displacement, just after severance but before chamfering, is shown in FIGURE VII. In this way no material of the object is lost or wasted. Additionally, burrs, turnings and chips, all a part of existing tube-cutting procedures, are avoided.

The instant invention is, of course, useful in severing a plurality of cylinders or tubes and could easily be used for the severance of one tube if one so desired. The embodiment depicted is easily capable of severing 100 objects simultaneously. This device is especially useful in the production of copper and aluminum, i.e., metal tubes or shells for use in the manufacture of explosive squibs delay elements or explosive detonators. Here a plurality of small metal tubes can be severed to exact uniform lengths in a very short period of time with the avoidance of the usual time for clean up due to the accumulation of turnings and chips in, and about, the apparatus in use. Additionally, a hazardous feature presently inherent in this type of work, as regards propellant chips, etc., is avoided.

Many other equivalent modifications will be apparent to those skilled in the art from a reading of the above without a departure from the inventive concept.

What is claimed is:

1. A severing assembly comprising a frame, means for providing oscillating motion of varying amplitude mounted on said frame, and a cutter plate held by said oscillating means and provided with a plurality of annular cutting surfaces which are stationary with respect to said plate.

2. A tube severing assembly comprising a frame, a first and a second means for providing oscillating motion of varying amplitude mounted on said frame, and a cutter plate held by each of said oscillating means, said plate comprising at least one plate having a plurality of apertures therethrough, each of said apertures being provided with an annular cutting surface.

3. The device of claim 2 wherein a magazine is pivotally mounted on said frame for swinging movement to and from a feeding position with respect to said cutter plate.

4. The apparatus of claim 2 wherein said oscillating means comprise a pair of eccentric drive mechanisms.

5. The device of claim 3 wherein tube guide means and tube feed means are mounted on said frame adjacent said cutter plate.

6. The apparatus of claim 4 wherein each of said mechanisms comprises a cylinder rotatably held by said frame, said cylinder having an eccentric longitudinal bore therethrough, a shaft rotatably contained in the bore of said cylinder, said shaft being provided with an offset extremity free of contact with said cylinder and said shaft being capable of being positioned within said cylinder to insure that the axis of rotation of said cylinder and of said offset extremity coincide, means for conjointly rotating said cylinder and shaft, means for independently rotating said shaft, and means for transmitting eccentric movement from said offset extremity to said cutter plate.

7. A tube severing apparatus adapted to simultaneously sever and chamfer a plurality of tubes which comprises a frame, a first and a second means for providing oscillating motion mounted on said frame, said first and second means each comprising a cylinder rotatably held by said frame, said cylinder having an eccentric longitudinal bore therethrough, a shaft rotatably contained in the bore of said cylinder, said shaft being provided with an offset extremity free of contact with said cylinder and being rotatably positionable within said cylinder to insure that the axis of rotation of said cylinder and of said offset extremity coincide, means for conjointly rotating said cylinder and shaft, means for independently rotating said shaft, a cutter plate comprising at least one substantially flat plate having a plurality of annular apertures of equal diameter therethrough, each of said apertures being provided with an annular, square-edged cutting surface and each of said apertures being tapered in a direction away from said cutting surface, and means for transmitting eccentric motion from said offset extremity to said cutter plate.

8. The device of claim 7 wherein a magazine having a plurality of tube holding means is pivotally mounted on said frame for swinging movement to and from a feeding position with respect to said cutter plate.

9. The device of claim 7 wherein a magazine assembly is provided, comprising the magazine of claim 8, feed means slidably mounted on said frame for movement to and from said cutter plate and said magazine, guide means mounted on said frame in a position between said feed means and said cutter plate, and pressure means for forcing tubes from said magazine.

10. The assembly of claim 9 wherein a tube receiving means is provided for collection of said severed tubes.

11. A cutter plate for simultaneously severing a plurality of objects which comprises at least one plate having a plurality of apertures therethrough, each of said apertures being provided with an annular cutting surface and each of said apertures being tapered outwardly from said cutting surface.

12. A device for producing eccentric motion of varying amplitude which comprises a frame, a cylinder rotatably held by said frame, said cylinder having an eccentric longitudinal bore therethrough, a shaft rotatably contained in said bore, said shaft being provided with an offset extremity free of contact with said cylinder and being rotatably positionable to insure that the axis of rotation of said cylinder and said offset extremity can coincide, means for conjointly rotating said cylinder and shaft, means for independently rotating said shaft, and means for transmitting eccentric motion from said offset extremity.

13. A method of severing and chamfering a plurality of cylinders which comprises securing each of said cylinders in a fixed position, simultaneously inducing complete circumferential displacement of cylinder material about a line on each of said cylinders, simultaneously chamfering the thus severed cylinders adjacent at least one side of said line, and collecting the severed cylinders.

14. In a tube severing apparatus the improvement which comprises a cutter plate comprising at least one plate having a plurality of apertures of equal diameter therethrough, each of said apertures being provided with an annular cutting surface, and each of said apertures being tapered outward from said cutting surface.

References Cited by the Examiner

UNITED STATES PATENTS

| 1,674,440 | 6/1928 | McCloskey | 30—102 |
| 2,038,254 | 4/1936 | Worthington | 82—59 |
| 2,271,033 | 1/1942 | Petersen | 30—102 |
| 3,024,687 | 3/1962 | Brownstein | 82—59 |

FOREIGN PATENTS 1,111,292   2/1956   France.

RICHARD H. EANES, JR., *Primary Examiner.*